F. MESSMER.
Faucet.

No. 160,275.

Patented March 2, 1875.

WITNESSES:
Chas. F. Weimer
J. W. Hesthil

INVENTOR:
Ferdinand Messmer
PER. Herthel & Co
ATTYS.

UNITED STATES PATENT OFFICE.

FERDINAND MESSMER, OF ST. LOUIS, MISSOURI.

IMPROVEMENT IN FAUCETS.

Specification forming part of Letters Patent No. 160,275, dated March 2, 1875; application filed August 19, 1874.

*To all whom it may concern:*

Be it known that I, FERDINAND MESSMER, of St. Louis, in the county of St. Louis and State of Missouri, have invented an Improved Faucet or Cock, of which the following is a specification:

This invention is an improvement in various essential respects of my patent for faucet dated June 23, 1874, No. 152,397. In my patent aforesaid a projecting hollow stem connected to a stationary stem having a coil-spring was shown, for the purpose of introducing and allowing the introduced hose to float on top of the fluid. This necessitated a careful and tight coiling of the hose round the outer stem, and force to push in the coiled hose in the shank of faucet preparatory to securing same to the vessel.

My present improvement dispenses with the use of the parts aforesaid, and instead I use but one stem, operated in and out by the operator, facilitating the securing of faucet to cask, and especially the introduction of the hose inside of the shank; also, my improvement relates to the manner in which the faucet can be used without the requirement of air communication, the latter being entirely cut off—that is, its inlet closed by operator—all of which will now more fully appear.

Figure 1:
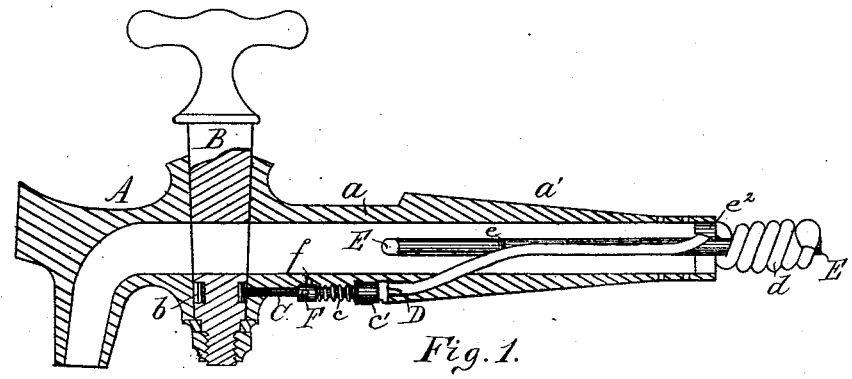
Figure 2:
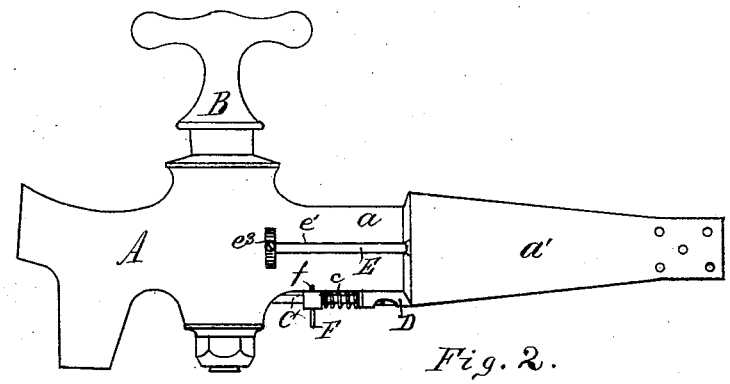
Figure 3:
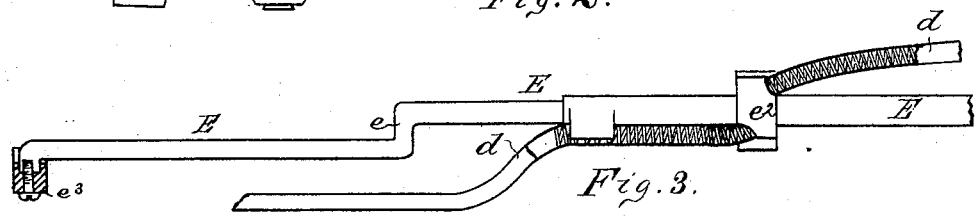
Figure 4:
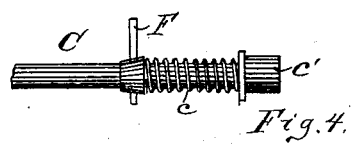
Figure 5:
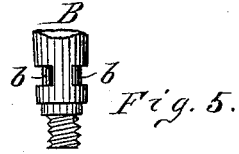

Of the drawing, Figure 1 is a longitudinal section of faucet, showing its interior parts. Fig. 2 is a side elevation of faucet. Fig. 3 is a top plan of movable stem, showing the hose in connection. Fig. 4 is a detail view of plunger end of horizontal rod. Fig. 5 is a detail view, showing the grooves in the T-handle that enable same to act as an eccentric.

A represents a cock or beer-faucet; $a$, its body; $a'$, its shank; B, its T-handle, all of ordinary construction. The T-handle I provide with grooves $b$ near its screw-stem, more clearly shown in Fig. 5. In line to engage the grooves $b$ is a horizontal rod, C. This extends from handle to junction with shank of faucet no matter what length of faucet is used. This rod C has a coiled spring, $c$, and plunger end $c'$, (see Fig. 4,) the other end of which being fitted to engage the grooves in handle. (See Figs. 1, 2, and 4.)

The rod C, when operated by its plunger $c'$, controls the air-tube D, and the spring $c$ returns rod to its original position. Hence, by turning the T-handle B, the rod C, by means of plunger $c'$, presses against the air-tube D, thereby cutting off the supply of air. When the faucet is closed the air-tube D is closed. When faucet is open to draw off the fluid, the coil-spring $c$ causes its rod C to return, thus opening tube and allowing air to enter.

To the air-tube D I connect one end of the hose $d$, the other end of which extends to reach the top of the fluid.

In order to have the hose thus to reach the top of the fluid in vessel my further-improved parts are as follows: I provide in the shank $a'$ a movable stem, E. This stem is of the shape shown in Fig. 3, having elbow $e$, which makes it pass from the middle of the shank out through faucet, as shown in Figs. 1 and 2. A groove, $e^1$, cut on the outer surface of the body of faucet, allows said stem E to slide forward and backward when operated. The stem E further has an outer head, $e^2$, (see Figs. 1 and 3,) which has open spaces to allow for the passage of the liquid; also, through one of said spaces the hose $d$ is passed. (See Figs. 1 and 3.) At its junction of fastening with stem E the hose has inside of it a coil-spring. I continue the stem E beyond its head $e^2$, to allow the hose to be coiled around stem. The end of the stem E which projects top of the body of faucet has a stud, $e^3$, by means whereof said stem is operated to slide in or out.

The operation of my faucet is as follows: The hose $d$ is coiled round the projecting end of the stem E, as shown in Fig. 1. The hose and stem are next pushed in the faucet in the position shown in Fig. 2. Now the faucet is ready to be inserted into the cask or vessel, and this done, the operator, by means of the stud $e^3$, returns or forces back the stem E to its original position, as shown in Fig. 1, which permits the hose $d$ to freely uncoil and float top of the fluid. The T-handle being crosswise, and the fluid not flowing or escaping, the air-passage is closed by virtue of the grooves in the handle forcing the horizontal rod C with its plunger end against and closing said air-inlet. As soon as the handle is turned and the fluid escapes, the grooves in the handle allows the coil-spring $c$ to force the bar or rod C back, thereby opening air communication to top of fluid in barrel.

In case the faucet is to be used for any length of time without the further use of air, it is in my improvement but necessary to cut off the air-supply. This I accomplish by turning the horizontal rod C partially round to allow a pin, F, (see Figs. 1, 2, 3,) to engage a groove, $f$, in the faucet, as indicated in Figs. 1 and 2. The faucet can thus be used without the inflow of air, and in case the flow of the liquid is not strong or forcible enough, the operator need but disengage the pin F out of its groove $f$, so as to allow the horizontal rod to move freely by the operation of the handle of faucet.

What I claim is—

1. The combination of the stem E, having stud $e^3$, head $e^2$, the hose $d$, and faucet or cock A, to operate as and for the purpose set forth.

2. The combination of the pin F, rod C, with groove $f$, and faucet or cock A, as and for the purpose set forth.

In testimony of said invention I have hereunto set my hand.

FERDINAND MESSMER.

Witnesses:
WILLIAM W. HERTHEL,
LOUIS WILKENS.